United States Patent [19]

Canfield

[11] 4,302,623

[45] Nov. 24, 1981

[54] ULTRASONIC BATCH SENSING APPARATUS FOR GLASS-MELTING FURNACES

[75] Inventor: Sheldon A. Canfield, Newark, Ohio

[73] Assignee: Owens-Corning Fiberglass Corporation, Toledo, Ohio

[21] Appl. No.: 95,882

[22] Filed: Nov. 19, 1979

[51] Int. Cl.³ .............................................. C03B 3/00
[52] U.S. Cl. ........................................ 13/6; 73/290 V
[58] Field of Search ..................... 13/6, 33; 73/290 V; 340/621

[56] References Cited

U.S. PATENT DOCUMENTS 4,162,473  7/1979  Utasi ............................. 73/290 V X
4,194,077  3/1980  Canfield et al. ........................... 13/6

Primary Examiner—Roy N. Envall, Jr.
Attorney, Agent, or Firm—Ronald C. Hudgens; Patrick P. Pacella; Paul T. Kashimba

[57] ABSTRACT

An apparatus for sensing the level of the glass batch in a glass-melting furnace. The apparatus comprises means for transmitting an ultrasonic signal toward the surface of the batch in the furnace, means for receiving the ultrasonic signal after it has been reflected by the surface of the batch, and means for distrubing a thermal inversion layer in the path of the ultrasonic signal in the gaseous medium between the means for transmitting and the surface of the batch. The means for transmitting, means for receiving and means for disturbing are positioned above the glass batch.

10 Claims, 4 Drawing Figures

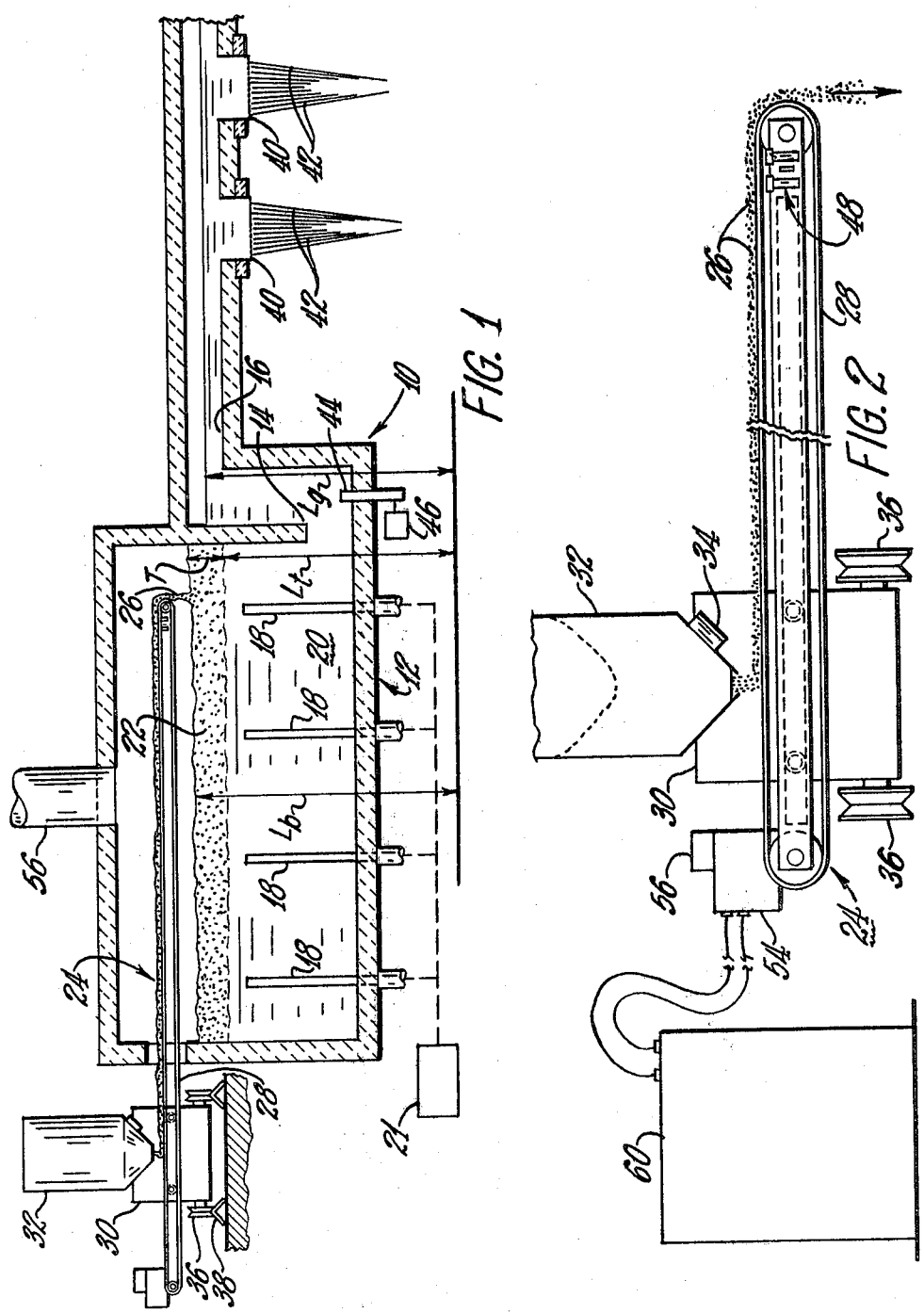

ULTRASONIC BATCH SENSING APPARATUS FOR GLASS-MELTING FURNACES

BACKGROUND OF THE INVENTION

This invention relates to glass-melting furnaces and, more particularly, to an apparatus for determining the level of batch in such furnace.

Electric glass-melting furnaces have electrodes that project into the furnace tank in a predetermined pattern, and such electrodes are immersed in the molten glass therein. Glass batch is continually supplied on top of the molten glass to provide both a source of supply and an insulating layer or crust. The glass batch is supplied by a feeder which is supported in a predetermined plane above the glass batch. The feeder is movably supported on rails located on one or both sides of the tank with the feeder being moved back and forth transversely across the furnace and longitudinally between the ends thereof to traverse the entire batch layer and to supply batch on the layer in a predetermined pattern. The batch supplied to the layer must be carefully controlled to ensure that a minimum thickness will be maintained over the entire top of the tank in order to reduce heat loss and also to protect the feeder itself against excessive heat.

In addition, it is also important that the level of the molten glass in the forehearth of the furnace which does not have any batch, be maintained constant for many operations. For example, where the glass from the forehearth is supplied to fiber-forming bushings, a change in the level of the glass in the forehearth can affect the operation of the bushings, and a fluctuation in the level can seriously hamper proper bushing throughput.

In my co-pending application, Ser. No. 864,429, filed Dec. 27, 1977, now U.S. Pat. No. 4,194,077, issued Mar. 18, 1980, there is disclosed a sensing means for determining the level of batch in a glass-melting furnace without physically contacting the batch. While this apparatus gives highly satisfactory results and represents a marked improvement over the sensing devices previously known in the art, I have now discovered that even more accurate sensing can be achieved by utilizing means for disturbing thermal inversion layers in the gaseous medium between the sensor and the top of the batch.

Ultrasonic ranging in gaseous media, as disclosed in my co-pending application Ser. No. 864,429, operates by measuring the time required for an acoustic wave emitted from a transmitter to travel from the transmitter to the top of the batch and back to a receiver after being reflected from the surface of the batch. A thermal inversion layer, i.e., an interface between cold and hot gas layers caused by a reversal of the normal temperature gradient, between the transmitter and the batch may also cause reflections. Such reflections result in an inaccurate measurement of the level of the batch, and, consequently, an incorrect adjustment in the amount of batch provided by the batch feeder. In certain instances, the error created can be quite large. For example, in one type of furnace the thermal inversion layer generally occurs at a distance of 3 to 5 inches above the surface of the batch with the normal distance between the sensor and the surface of the batch being in the range of $7\frac{1}{2}$ to $16\frac{1}{2}$ inches.

Therefore, it is an object of this invention to provide a reliable and accurate ultrasonic sensing apparatus for determining the level of the batch in a glass melting furnace without being affected by thermal inversion layers in the gaseous medium of the furnace.

SUMMARY OF THE INVENTION

In accordance with the present invention there is provided an apparatus for sensing the level of the glass batch in a glass-melting furnace. The apparatus comprises means for transmitting an ultrasonic signal toward the surface of the batch in the furnace, means for receiving the ultrasonic signal after it has been reflected by the surface of the batch, and means for disturbing a thermal inversion layer in the path of the ultrasonic signal in the gaseous medium between means for transmitting and the surface of the batch. The means for transmitting, means for receiving and means for disturbing are positioned above the glass batch.

The batch sensing apparatus of the present invention may be attached to the batch feeder and, hence, moved back and forth in a given horizontal plane over the batch along with the feeder. The sensing apparatus employs ultrasonic waves to determine the level of the batch; this determination can then be used to change the power input to the furnace or the amount of batch supplied by the feeder in order to maintain a constant batch thickness, thereby ensuring a constant throughput of the furnace and a constant glass level in the forehearth.

The means for disturbing a thermal inversion layer in the path of the signal in the gaseous medium between the means for transmitting and the top of the batch comprises a means for moving a gaseous medium, whereby a portion of the medium in the proximity of the transmitter-receiver assembly is gathered and propelled essentially collinearly with the paths of the transmitted and reflected acoustic waves. The medium is propelled with sufficient velocity so that over the desired range of measurement the mechanical energy of the propelled medium overpowers the thermodynamic conditions necessary to maintain a thermal inversion layer between the transmitter and the surface of the batch. However, the ranging unit does not disturb the bath surface, thus complying with governmental health and safety standards since no dust cloud is created.

In addition to providing a valid ultrasonic ranging measurement despite the presence of thermal inversion layers above the batch crust, the present invention also improves the accuracy of the compensation of the measurement for temperature variations. The ultrasonic transmitter and receiver and the rate of wave transmission through the medium are affected by temperature; therefore, a temperature sensor is positioned near the intake of the means for disturbing the thermal inversion layer. The signal from the temperature sensor is fed to an electrical circuit to correct the signal on the basis of the temperature at the intake, since this is the temperature of the medium traversed by the acoustic waves. In addition, the present invention maintains symmetry of the propelled column of gaseous medium with respect to the transmitted and reflected acoustic waves to provide cancellation of the doppler shift introduced by the fact that the transmitted wave is moving with the propelled medium and the reflected wave is moving against it. If the symmetry is maintained, the transit time changes are equal, but of opposite sign, thus canceling any doppler shift.

Other objectives, advantages and applications of the present invention will be made apparent by the following detailed description of the preferred embodiment of the invention.

BRIEF DESCRIPTION OF THE DRAWINGS

FIG. 1 is a partial schematic view in longitudinal cross section of an electrically-operated, glass-melting furnace utilizing the present invention.

FIG. 2 is an enlarged, side view in elevation of a glass batch feeder of the furnace of FIG. 1.

DETAILED DESCRIPTION OF THE PREFERRED EMBODIMENT

Figure 4:
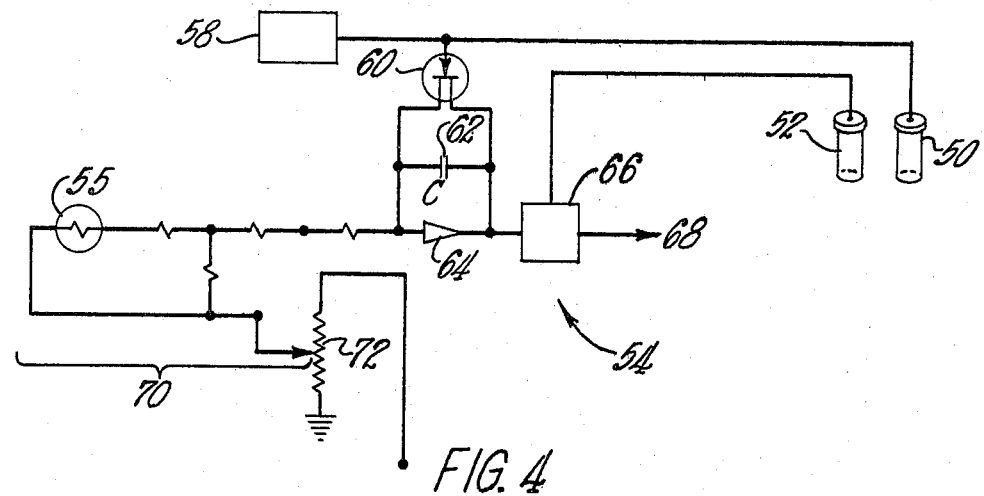
FIG. 4 is a diagrammatic view of an electrical circuit employed with the batch level sensing apparatus of FIG. 3.

Referring to FIG. 1, a glass-melting furnace utilizing the present invention is indicated generally at 10. Furnace 10 has a melting tank 12 from which glass is discharged past a skimmer block 14 to a discharge passage or forehearth 16. A plurality of electrodes 18 extend upwardly through the bottom of melting tank 12. The electrodes 18 are suitably positioned throughout tank 12 in a desired pattern, as is well known in the electrical furnace art, and are supplied with power from a controlled source of power designated generally by 21. The glass in tank 12 is melted by current flowing between electrodes 18 to form a pool 20 of molten glass. A layer or crust 22 of glass batch is established on the surface of pool 20 so that batch layer 22 replenishes the molten glass of pool 20 that flows outwardly through forehearth 16. Batch layer 22 also acts as an insulating blanket on pool 20 to provide higher efficiency for furnace 10 and also to protect the feeding means for the batch.

A batch feeder 24 supplies batch 26 to the top of layer 22 in a predetermined pattern. Batch feeder 24 has a conveyor belt 28 supported and driven by a drive unit 30. Batch is supplied to conveyor belt 28 from a supply hopper 32 with the rate of feed from hopper 32 to belt 28 being controlled by a vibrator 34 which is mounted on hopper 32.

Belt 28 is moved back and forth in left-hand and right-hand directions, as viewed in FIG. 1, by drive unit 30, and drive unit 30 has wheels 36 mounted on rails 38 to move unit 30 and belt 28 back and forth across tank 12 to supply batch 26 over layer 22. Feeder 24 is illustrative of one type of feeder for supplying batch 26 to batch layer 22, which incorporates the batch level sensing apparatus of the present invention. Other types of batch feeders can also utilize the present invention; therefore, the batch feeder described should be interpreted as exemplary and not in a limiting sense.

The molten glass of pool 20 flows under skimmer block 14 and along forehearth 16 to fiber-forming bushings 40, from which glass fibers 42 are attenuated, as is known in the art. A change in the level of molten glass in forehearth 16 can change the throughput of bushings 40 and alter the bushing operations to a substantial degree. Therefore, it is desirable to maintain the glass at a constant level in the forehearth; this level can be controlled by regulating the thickness of the glass batch layer or crust 22 and the height or level of it in tank 12. The level of the molten glass in forehearth 16 is commonly measured by a bubbler 44 which emits air or other gas to the glass beyond skimmer block 14 with the back pressure of the gas in bubbler 44 being measured by a suitable pressure-sensing device 46, such as that disclosed in Trethewey, U.S. Pat. No. 3,200,971. The level of glass batch 22 in tank 12 can also be measured by similar or other suitable sensing means.

The relationship between the level of batch layer 22 and the level of the glass in forehearth 16 and tank 12, as measured from a common datum line, is shown by the following equation:

$$T = L_b - L_t = \frac{L_b - L_g}{1 - d_b/d_g}$$

Wherein:
$L_b$ = level of the batch layer
$L_t$ = level of the molten glass in tank 12
$T$ = thickness of batch layer 22
$L_g$ = level of the molten glass in forehearth 16
$d_g$ = the density of the glass
$d_b$ = the density of the batch The density of the batch will vary slightly according to the thickness of layer 22 because of the compaction of the batch; however, this variation is not significant in the vast majority of cases. From the above equations, the thickness of the batch layer or crust 22 can be determined by measuring the glass level $L_g$ through bubbler 44 and by measuring the level or height $L_b$ of the batch.

Figure 3:
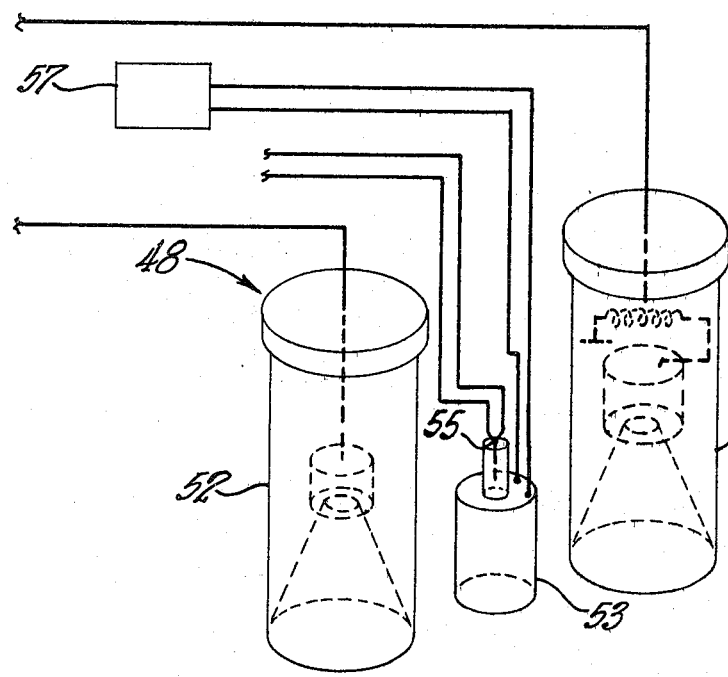
FIG. 3 is a schematic view of the batch level sensing apparatus of the present invention.

Referring to FIGS. 2 and 3, the batch level can be determined by utilizing an ultrasonic sensing unit indicated at 48. Unit 48 is mounted on feeder 24 at the discharge end of belt 28 and moves therewith over batch 22.

Unit 48 includes an ultrasonic transmitter 50, an ultrasonic receiver 52 and a vane-axial fan 53 with moderate air moving capacity, all of which are commercially available. Transmitter 50 has barium type titanate crystals and an autotransformer to send ultrasonic waves downwardly toward the surface of batch layer 22. Waves reflected from the surface of batch layer 22 are received by receiver 52, with the time delay between sending and receiving indicating the distance of the surface of batch layer 22 from unit 48. Quite often, thermal inversion layers are present in the gaseous medium over batch layer 22; such thermal inversion layers can reflect the acoustic wave emitted from transmitter 50, thus resulting in an inaccurate measurement of the level of batch layer 22.

Fan 53, which is mounted between transmitter 50 and receiver 52, gathers a portion of the gas proximate unit 48 and propels such gas essentially collinearly with the path of the transmitted and reflected acoustic waves. The gas propelled by fan 53 has sufficient velocity to overpower the thermodynamic conditions necessary to maintain a thermal inversion layer between transmitter 50 and the surface of batch layer 22; however, the capacity of fan 53 is chosen so that the propelled gas does not disturb the surface of batch layer 22 since such disturbance can create a dust cloud.

In addition, it is desirable to maintain symmetry of the propelled column of gas with respect to the transmitted and reflected acoustic wave paths to provide cancellation of the doppler shift; such symmetry is obtained by positioning fan 53 so that it is equidistant from transmitter 50 and receiver 52 and by energizing fan 53 by a regulated power source 57. By ensuring that the same quantity of propelled medium is moving at the same speed with the transmitted wave and against the reflected wave, the transit time changes are equal, but of opposite sign, thus canceling each other.

Although a vane-axial fan mounted equidistant from transmitter 50 and receiver 52 is the preferred embodiment, any fan or other air-moving means having the aforesaid characteristics could be utilized in the present invention. Particularly, such fan or air moving means must have sufficient mechanical energy to overcome any thermal inversion layer in the desired range of measurement, but be of low enough energy that the surface of batch layer 22 is not disturbed, and must be able to provide a small symmetrical column of air. For example, an 8 CFM free delivery vane-axial fan has been found to provide the required velocities at ranges up to 20 inches, yet its energy is sufficiently low enough that the batch surface is undisturbed (no dust cloud).

The temperature in furnace 10 above batch layer 22 will vary considerably, depending upon the direction and rate of flow of gases through a furnace stack 56 which is shown in FIG. 1. Ventilators in the building which houses furnace 10, for example, are usually opened in the summer and closed in the winter. Temperature changes affect transmitter 50 and receiver 52 and also the rate of wave transmission. To compensate for such variances, a temperature sensor 55, such as a thermistor, is mounted adjacent the intake of fan 53, which is shown representatively as being at the upper end of the fan 53 in FIG. 3. Accordingly, temperature sensor 55 senses the temperature of the medium traversed by the acoustic waves, thus resulting in a more accurate signal than if temperature sensor 55 were located elsewhere. The signal from temperature sensor 55 is fed to an electrical circuit 54 which may be located on batch feeder 24, as shown in FIG. 2, or in any other convenient location. Similarly, regulated power source 57 may be located on batch feeder 24 or in any other convenient location.

The electrical configuration of circuit 54 is shown in FIG. 4. Clock 58 is connected to the gate of a field-effect transistor 60 and also to transmitter 50. The drain and source electrodes of FET 60 are connected in parallel with capacitor 62 and operational amplifier 64 which is in the form an integrated circuit. The output terminal of operational amplifier 64 is connected to a sample and hold circuit 66 which is also connected to receiver 52. In addition, sample and hold circuit 66 may provide an output signal on terminal 68 to a computer or other device. The input terminal of operational amplifier 64 is connected to an impedence network 70. Temperature sensor 55 is connected to network 70, which consists of a network of series and parallel resistors which are connected across a variable power supply 72.

Clock 58 provides an electrical pulse to transmitter 50 which causes transmitter 50 to send a pulse of ultrasonic energy toward batch layer 22. At the same time, operational amplifier 64 is reset to zero by FET 60 and hence begins to integrate upwardly. When receiver 52 receives the reflected ultrasonic energy, receiver 52 actuates sample and hold circuit 66 which senses the level to which operational amplifier 64 has risen. Sample and hold circuit 66 then retains its value until actuated again. A signal from sample and hold circuit 66 is defined by the following equation:

$$r = \frac{1}{ZC} \int_0^t e_i dt$$

Wherein:

Z = temperature compensation factor, i.e., the impedance of network 70 in combination with temperature sensor 55
C = capacitance
$e_i$ = bias adjustment, i.e., voltage provided by variable power supply 72
t = time differential
r = output of operational amplifier 64 at time t With the proper temperature compensation, this signal is proportional to the distance traveled by the ultrasonic pulse and indicates the level of batch layer 22. Fan 53 is running continuously at a constant speed during both the sending and receiving of the ultrasonic pulse thereby insuring that an inaccurate reading will not be caused by a reflection at a thermal inversion layer.

The signal can be averaged over all or part of batch layer 22 and can be fed to a computer which also receives other information including the pressure sensed by pressure sensor 46. The signal resulting from the computer is then employed to change the power input to the furnace 10 or to change the rate of batch feed thereto to change the batch level and thickness. In a preferred form, the power input to furnace 10 is varied. If the batch is too thick, the power is increased, and vica versa. If desired, the amplitude of vibration of vibrator 34 can be changed to change the rate of supply of the batch to belt 28.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. An apparatus for sensing the level of the glass batch in a glass-melting furnace, said apparatus comprising:
    a. means for transmitting an ultrasonic signal toward the surface of said batch in said furnace;
    b. means for receiving said ultrasonic signal after said signal has been reflected by said surface; and
    c. means for disturbing a thermal inversion layer in the path of said wave in the gaseous medium between said means for transmitting and said surface, said means for transmitting, said means for receiving and said means for disturbing being positioned above said batch.

2. An apparatus as recited in claim 1, wherein said means for disturbing comprises a means for moving a portion of said gaseous medium.

3. An apparatus as recited in claim 1, wherein said means for disturbing propels a portion of said gaseous medium towards said surface.

4. An apparatus as recited in claim 3, wherein said propelled gaseous medium is propelled essentially collinearly with the transmitted and reflected ultrasonic waves.

5. An apparatus as recited in claim 4, wherein said means for disturbing is a vane-axial fan.

6. An apparatus as recited in claim 3, wherein said means for disturbing further comprises an intake through which said gaseous medium is gathered, and said apparatus further comprises means for sensing the temperature of said gaseous medium, said means for sensing the temperature being positioned near said intake.

7. An apparatus as recited in claim 1, wherein said means for disturbing is positioned equidistant between said means for transmitting and said means for receiving.

8. An apparatus as recited in claim 1, wherein said means for receiving provides an electrical signal when it receives said ultrasonic signal, and said apparatus further comprises means for sensing the temperature of said gaseous medium and means for changing the magnitude of said signal provided by said means for receiving in response to the temperature sensed by said means for sensing the temperature.

9. An apparatus as recited in claim 8, wherein said apparatus further comprises means responsive to said signal from said means for receiving for causing an increase in the thickness of said batch when the level thereof decreases and for causing a decrease in the thickness of said batch when the level thereof increases.

10. An apparatus as recited in claim 1, wherein said furnace further comprises a movable batch feeder, and wherein said means for transmitting, said means for receiving and said means for disturbing are attached to said feeder at a predetermined height.

* * * * *